United States Patent
Vogel et al.

(10) Patent No.: US 10,077,814 B2
(45) Date of Patent: Sep. 18, 2018

(54) HYDRODYNAMIC MACHINE AND DYNAMIC PRESSURE PUMP THEREFOR

(71) Applicant: VOITH PATENT GMBH, Heidenheim (DE)

(72) Inventors: Thomas Vogel, Schillingsfuerst (DE); Rainer Schips, Ellwangen (DE)

(73) Assignee: Voith Patent GmbH, Heidenheim (DE)

( * ) Notice: Subject to any disclaimer, the term of this patent is extended or adjusted under 35 U.S.C. 154(b) by 196 days.

(21) Appl. No.: 15/123,785

(22) PCT Filed: Mar. 2, 2015

(86) PCT No.: PCT/EP2015/054259
§ 371 (c)(1),
(2) Date: Sep. 6, 2016

(87) PCT Pub. No.: WO2015/132182
PCT Pub. Date: Sep. 11, 2015

(65) Prior Publication Data
US 2017/0016493 A1    Jan. 19, 2017

(30) Foreign Application Priority Data
Mar. 3, 2014 (DE) .......................... 10 2014 203 835

(51) Int. Cl.
F16D 33/14    (2006.01)
F16D 33/10    (2006.01)
(Continued)

(52) U.S. Cl.
CPC .............. *F16D 33/10* (2013.01); *F04D 29/22* (2013.01); *F04D 29/4293* (2013.01);
(Continued)

(58) Field of Classification Search
CPC .......... F16D 33/10; F16D 33/14; F04D 29/22; F04D 29/4293; F04D 29/445; B60T 10/02
(Continued)

(56) References Cited

U.S. PATENT DOCUMENTS 1,937,364 A    11/1933  Sinclair
3,747,348 A     7/1973  Bilton
(Continued)

FOREIGN PATENT DOCUMENTS

DE    710416 C    9/1941
DE    1224728 C2  1/1998
(Continued)

*Primary Examiner* — F. Daniel Lopez
*Assistant Examiner* — Daniel Collins
(74) *Attorney, Agent, or Firm* — Laurence A. Greenberg; Werner H. Stemer; Ralph E. Locher

(57) ABSTRACT

A hydrodynamic machine contains a bladed primary wheel driven by a rotary shaft and a bladed secondary wheel, which together form a work chamber filled with a working medium. The machine has a pressure pump for delivering a working medium from the work chamber. The pressure pump has a first inlet, which projects into the work chamber, and has a first inlet opening which is aligned with the rotary shaft in the circumferential direction. The pressure pump has a second inlet which projects into the work chamber and has a second inlet opening which is aligned to the rotary shaft in the circumferential direction opposite to the first inlet opening. The first and second inlets are joined to a common working medium channel behind the two inlet openings. The first and second inlets extend adjacent to each other in the same flow direction separated by a separation wall.

20 Claims, 2 Drawing Sheets

(51) Int. Cl.
*F16D 33/06* (2006.01)
*F16D 33/18* (2006.01)
*F04D 29/22* (2006.01)
*F04D 29/42* (2006.01)
*F04D 29/44* (2006.01)

(52) U.S. Cl.
CPC .......... *F04D 29/445* (2013.01); *F16D 33/06* (2013.01); *F16D 33/18* (2013.01)

(58) Field of Classification Search
USPC .......................................... 60/351, 337, 357
See application file for complete search history.

(56) References Cited

U.S. PATENT DOCUMENTS

| | | |
|---|---|---|
| 5,435,133 A | 7/1995 | Schust et al. |
| 6,065,286 A | 5/2000 | Hellinger |
| 6,698,195 B1 | 3/2004 | Hellinger |

FOREIGN PATENT DOCUMENTS

| | | |
|---|---|---|
| DE | 10327133 A1 | 1/2005 |
| DE | 102007056495 A1 | 4/2009 |
| EP | 0801244 A1 | 10/1997 |
| EP | 0864771 A2 | 9/1998 |
| EP | 1141568 A1 | 10/2001 |
| NL | 28065 C | 10/1932 |

HYDRODYNAMIC MACHINE AND DYNAMIC PRESSURE PUMP THEREFOR

BACKGROUND OF THE INVENTION

Field of the Invention

The invention relates to a hydrodynamic machine, e.g. a hydrodynamic coupling or a hydrodynamic retarder, comprising a work chamber, which is formed by two bladed wheels and can be filled with a working medium, e.g. oil or water or a water mixture, from which the working medium can be discharged by means of a dynamic pressure pump. The present invention furthermore relates to a dynamic pressure pump, in particular for a hydrodynamic machine of this kind.

Hydrodynamic couplings of the type in question, having a corresponding dynamic pressure pump, also referred to as a scoop tube, are disclosed, for example, in DE 42 24 728 C2, EP 0 801 244 B1, EP 0 864 771 B1, EP 1 141 568 B1, DE 103 27 133 B4 and DE 10 2007 056 495 A1.

A dynamic pressure pump of this kind operates on the following principle: when at least the primary wheel is driven, the working medium in the bladed region of the primary wheel in the work chamber not only undergoes acceleration radially outward in a centrifugal direction but is also accelerated circumferentially with respect to the axis of rotation in the direction of rotation of the primary wheel. If the work chamber is connected to a secondary chamber in a manner which allows transmission of working medium, the working medium also runs in a corresponding manner around the axis of rotation in the direction of rotation of the primary wheel in the secondary chamber. Accordingly, it is possible, by arranging an inlet opening of the dynamic pressure pump in the circumferential direction in the direction of rotation, opposite the flow direction of the working medium, to produce a dynamic pressure in front of or in the inlet opening, said dynamic pressure leading to the delivery of working medium from the work chamber or from the secondary chamber into the working medium inlet of the dynamic pressure pump, which inlet is provided with the inlet opening. At the other end in which working medium transmission takes place, the dynamic pressure pump is connected to an external working medium circuit or to a storage chamber for working medium, with the result that the working medium delivered into the working medium inlet of the dynamic pressure pump by means of the dynamic pressure is delivered into the external working medium circuit, the storage chamber or the environment and, accordingly, is no longer available in the work chamber if there is no additional recirculation into the work chamber. As a result, the work chamber empties. If there is additional recirculation, the dynamic pressure pump can also be used for a continuous exchange of working medium from the work chamber with the external working medium circuit or with the storage chamber, in order to cool the working medium for example.

By means of a dynamic pressure pump of this kind, the hydrodynamic machine can be embodied as a fill-controlled hydrodynamic machine of the kind to which the present invention in accordance with an embodiment in which the filling level of the work chamber can be set in an intentionally variable manner relates.

By virtue of the fact that the circulation of the working medium in a circumferential direction around the axis of rotation is established by the direction of rotation of the bladed primary wheel, which can, however, vary from application to application—there being either a clockwise or counterclockwise direction of rotation when viewing the rear side of the primary blade wheel—at least two different embodiments of dynamic pressure pumps are required for a hydrodynamic machine, depending on the direction of rotation in which the hydrodynamic machine is supposed to operate. This leads not only to an unwanted multiplicity of components for design, production and supply of spare parts but also harbors the risk of incorrect installation of a hydrodynamic machine, namely if, when driving a conveyor belt for example, said machine is installed in a drive on the wrong side of the conveyor belt. It may then be necessary to move the drive from one side of the drum of the conveyor belt drive to the other side of the drum by means of which the belt is driven.

One solution of the abovementioned problem can be achieved by means of a dynamic pressure pump having two inlet openings aligned in opposite circumferential directions of the hydrodynamic machine, although it must be possible to selectively close such inlet openings by means of a valve timing mechanism or a check valve in such a way that the working medium cannot flow through the first inlet opening and then back out of the dynamic pressure pump through the second inlet opening. However, such a valve leads to unwanted flow noises, which are not acceptable in many applications.

BRIEF SUMMARY OF THE INVENTION

It is therefore the underlying object of the present invention to indicate a hydrodynamic machine of the type described at the outset and a dynamic pressure pump therefor in which the disadvantages mentioned are reduced. At the same time, the hydrodynamic machine should advantageously achieve at least approximately the same efficiency as known designs. At the same time, the unwanted noise development mentioned should be largely avoided in comparison with dynamic pressure pumps having just one inlet opening.

The object according to the invention is achieved by a hydrodynamic machine and by a dynamic pressure pump. Advantageous and particularly expedient embodiments of the invention are given in the dependent claims.

More specifically, a hydrodynamic machine according to the invention has a bladed primary wheel that can be driven around an axis of rotation and a stationary or likewise revolving bladed secondary wheel, which together form a work chamber that can be filled or is at all times filled with a working medium. A dynamic pressure pump is furthermore provided, by means of which working medium can be discharged at least indirectly from the work chamber and, in particular, from the entire hydrodynamic machine. Here, "indirect discharge" should be taken to mean that the dynamic pressure pump does not have to act directly on the working medium in the work chamber but that discharge can also take place via an interposed secondary chamber, into which working medium flows from the work chamber, wherein the degree of filling of the work chamber is dependent on the degree of filling of the secondary chamber.

The dynamic pressure pump has a first working medium inlet, which projects into the work chamber or into the secondary chamber connected to the latter in a manner which allows transmission of working medium, and a first inlet opening, which is aligned in the circumferential direction with respect to the axis of rotation. Thus, when rotation around the axis of rotation is imparted to the working medium by the primary wheel, in addition to radially outward acceleration, and this first inlet opening is opposed to the flow direction of the working medium in the circumferential direction, a dynamic pressure can build up in front of and in the inlet opening, by means of which dynamic pressure the working medium is delivered from the work chamber or from the secondary chamber into the working medium inlet, provided that the driving direction of the primary wheel is in the direction into the inlet opening.

According to the invention, however, the dynamic pressure pump has an additional second working medium inlet, which likewise projects into the work chamber or into the secondary chamber connected to the latter in a manner which allows transmission of working medium, and a second inlet opening, which is aligned oppositely to the first inlet opening in the circumferential direction with respect to the axis of rotation. This second working medium inlet serves to ensure that the corresponding dynamic pressure is built up in front of said inlet or in said inlet when the primary wheel is driven around the axis of rotation in the other direction and the working medium thus flows in a circumferential direction opposed to the second inlet opening and hence via the first inlet opening, which is then of course aligned in the flow direction of the working medium. Accordingly, the dynamic pressure pump operates independently of the direction of rotation of the bladed primary wheel.

According to the invention, the first working medium inlet and the second working medium inlet are joined in a manner which allows transmission of working medium to form a common working medium channel after the two inlet openings, as seen in the flow direction of the working medium through the dynamic pressure pump.

According to the invention, ahead of the common working medium channel as seen in the flow direction of the working medium, the first working medium inlet and the second working medium inlet extend adjacent to each other in the same direction and are separated by a dividing wall. This means that the flow channels, formed by the two working medium inlets, for the working medium extend adjacent to one another over a section, in particular parallel and/or equidistantly to one another and are separated from one another only by the dividing wall before they combine to form the common working medium channel. Here, the dividing wall can be inserted as a separate component after the production of the working medium inlets or can be produced jointly and integrally therewith.

In particular, the first working medium inlet and the second working medium inlet, starting from the inlet openings thereof, initially extend toward one another and then in the same direction mentioned or in equidistant arrangement before they combine to form the common working medium channel.

It is advantageous if the two working medium inlets have a free, invariable flow cross section at least from the inlet openings thereof to the common working medium channel, in particular from the inlet openings thereof to an end remote therefrom, as it were the outlet end, of the common working medium channel. This means that no element that adjusts the flow cross section, in particular no valve, such as a shutoff valve or check valve, is provided that can restrict the flow cross section for the working medium to a greater or lesser extent in said region.

It is advantageous if, starting from their inlet openings, the first working medium inlet and the second working medium inlet initially extend toward one another and then in each case in an arc in a common direction. The arcs can cover an angle of substantially or exactly 90°, for example. However, deviations from this are also permissible, e.g. by ±20° or by ±10°.

According to one embodiment of the invention, the two arcs are followed in the flow direction of the working medium by a common deflection. A deflection of this kind can have or cover an angle of 70° to 110°, in particular of 90°, for example.

According to one embodiment of the invention, the dividing wall reaches as far as the rear end, i.e. the outlet end, of the deflection as seen in the flow direction of the working medium and can then be followed by the common working medium channel, which, in particular, extends in the direction of the axis of rotation or parallel thereto.

Although in the present case the operation of the hydrodynamic machine is illustrated by means of revolution or flow of the working medium in a circumferential direction around the axis of rotation, it is also possible, according to one embodiment of the invention, for the dynamic pressure pump to be driven to produce, intensify or reduce a corresponding dynamic pressure in one of the two inlet openings. It is thus possible to deliver working medium from a chamber which does not revolve in the circumferential direction or to selectively increase or reduce the dynamic pressure by driving the dynamic pressure pump.

In order to reduce oscillations and/or noise which can occur in the dynamic pressure pump owing to the provision of two oppositely directed inlet openings, it is advantageous if the common working medium channel has a working medium transmission length which is a multiple of the working medium transmission lengths in each case from one of the two inlet openings to the common working medium channel. For example, the working medium transmission lengths of the common working medium channel is at least three times, five times, seven times or ten times the length from an inlet opening to the common working medium channel, i.e. to the start thereof, based on the flow direction of the working medium through the dynamic pressure pump.

The common working medium channel can extend in an exclusively linear fashion or can have at least one deflection, e.g. of 70° to 110°, in particular of substantially or exactly 90°.

In order to further reduce oscillations and/or noise, a diffuser can be formed in the common working medium channel, i.e. the common working medium channel widens in the flow direction of the working medium. In particular, this diffuser is positioned after the deflection.

At least one constriction of the flow cross section can be provided in the common working medium channel and/or ahead of the latter in the flow direction. In particular, a constriction is provided directly ahead of the inlet to the diffuser.

According to one embodiment of the invention, the dynamic pressure pump has an outflow opening or an outflow channel which extends in the direction of the axis of rotation of the hydrodynamic machine. Via this outflow opening or this outflow channel, the working medium which has been delivered into the corresponding working medium inlet by means of the dynamic pressure emerges from the dynamic pressure pump. In particular, this outflow channel is formed by the last section of the common working medium channel.

According to one embodiment of the invention, the hydrodynamic machine is embodied as a hydrodynamic coupling and accordingly comprises a bladed secondary wheel, which likewise revolves around the axis of rotation. The bladed secondary wheel is driven by the bladed primary wheel by torque transmission or driving power transmission by means of the hydrodynamic circulation of the working medium in the work chamber. In particular, a storage chamber for working medium that is not in the work chamber is furthermore provided, said storage chamber being connected to the dynamic pressure pump in such a way that said pump delivers the working medium discharged at least indirectly from the work chamber into the storage chamber, wherein, according to one embodiment, the storage chamber likewise revolves around the axis of rotation or, according to another embodiment, is arranged in a stationary manner, i.e. in such a way that it does not revolve.

As explained, it is possible, according to a first embodiment, for the dynamic pressure pump to be held stationary, with the result that the working medium inlets do not revolve, or for it to be driven in order thereby to at least partially produce or vary the desired dynamic pressure ahead of the working medium inlets.

A dynamic pressure pump according to the invention, which is embodied particularly for a hydrodynamic machine of the type described here, comprises a first working medium inlet having a first inlet opening and a second working medium inlet having a second inlet opening, wherein the first inlet opening and the second inlet opening are aligned oppositely to one another and the first working medium inlet and the second working medium inlet are joined in a manner which allows transmission of working medium to form a common working medium channel after the two inlet openings. As already explained with reference to the hydrodynamic machine, ahead of the common working medium channel as seen in the flow direction of the working medium, the two working medium inlets extend adjacent to each other in the same direction and are separated by a dividing wall. As regards the further details, attention is drawn to the statements made with reference to the hydrodynamic machine.

The solution according to the invention can be used both for hydrodynamic couplings with just one work chamber and for "double couplings".

BRIEF DESCRIPTION OF THE SEVERAL VIEWS OF THE DRAWING

The invention will be explained by way of example below with reference to an illustrative embodiment and to the figures, in which.

DESCRIPTION OF THE INVENTION

Figure 1:
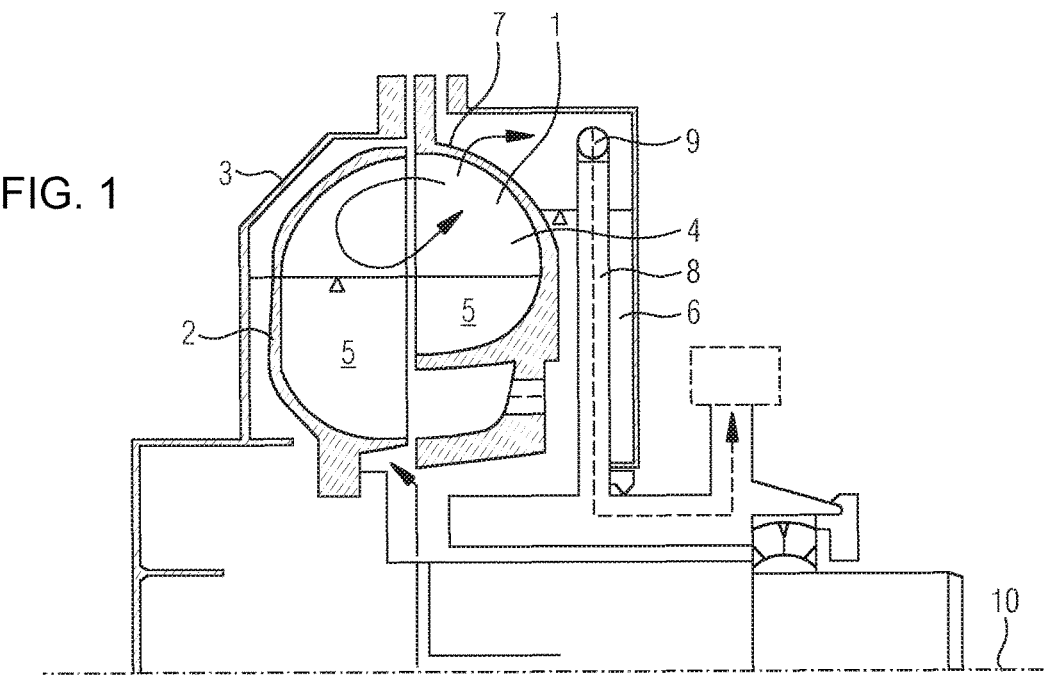
FIG. 1 shows a schematic illustration of one embodiment of the invention in an axial section through a hydrodynamic coupling.

In FIG. 1, a hydrodynamic coupling having a primary wheel 1 and a secondary wheel 2 is shown in a schematic illustration, said wheels being surrounded by a housing 3 and together forming a work chamber 4 filled with working medium. In the region of the work chamber 4, the primary wheel 1 and the secondary wheel 2 each carry a multiplicity of blades 5 in order to form a hydrodynamic circulatory flow of the working medium in the work chamber 4.

Outside the work chamber 4, a secondary chamber 6 is provided enclosed in the hydrodynamic coupling, in this case likewise enclosed by the housing 3. The working medium flows via a working medium outlet 7 out of the work chamber 4 into the secondary chamber 6. To discharge working medium from the secondary chamber 6, a dynamic pressure pump 8 is provided, which projects into the secondary chamber 6 in such a way that the two inlet openings of said pump (only the first inlet opening 9 is visible in FIG. 1 since the second inlet opening is oppositely aligned) dip into the working medium located in the secondary chamber 6. When a dynamic pressure of the working medium is established ahead of the first inlet opening 9 (or of the second inlet opening), either due to revolution of the working medium in a circumferential direction relative to the axis of rotation 10, around which the primary wheel 1 and the secondary wheel 2 also revolve, and/or due to driving of the dynamic pressure pump 8, working medium is delivered from the secondary chamber 6 by means of the dynamic pressure pump 8, e.g. into an external working medium circuit (not shown specifically here) or into a storage chamber, see the arrow with the dashed line and the box in dashed lines, which can represent either the external working medium circuit or the storage chamber.

Here, the supply of working medium to the work chamber 4 is shown only by way of example, being via a channel in the driving shaft or driven shaft for example.

As a departure from the illustration in FIG. 1, the housing 3 could also be embodied as a revolving housing, which is connected for conjoint rotation to the primary wheel 1 or the secondary wheel 2, for example.

Figure 2:
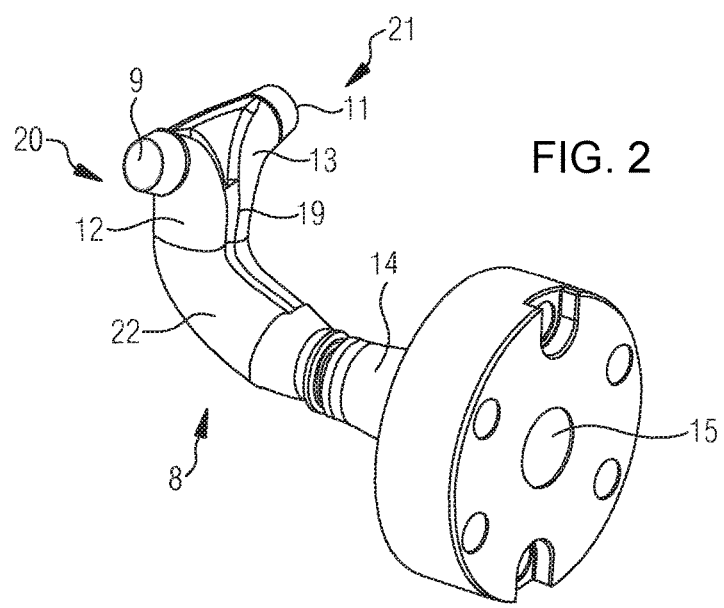
FIG. 2 shows an advantageous design of a dynamic pressure pump according to the invention, e.g. for a hydrodynamic machine.

An advantageous embodiment according to the invention of a dynamic pressure pump 8 is then shown in FIG. 2. Here, the two mutually oppositely directed inlet openings for the working medium, namely the first inlet opening 9 and the second inlet opening 11, can be seen. The working medium flows either via the first inlet opening 9 of a first working medium inlet 12 or the second inlet opening 11 of a second working medium inlet 13 into the common working medium channel 14, which adjoins the first working medium inlet 12 and the second working medium inlet 13, and then flows out of the dynamic pressure pump 8 via an outflow opening 15 of the dynamic pressure pump 8, which in the present case is aligned in an axial direction. The common working medium channel 14 advantageously has a greater working medium transmission length than either the first working medium inlet 12 or the second working medium inlet 13.

Figure 3:
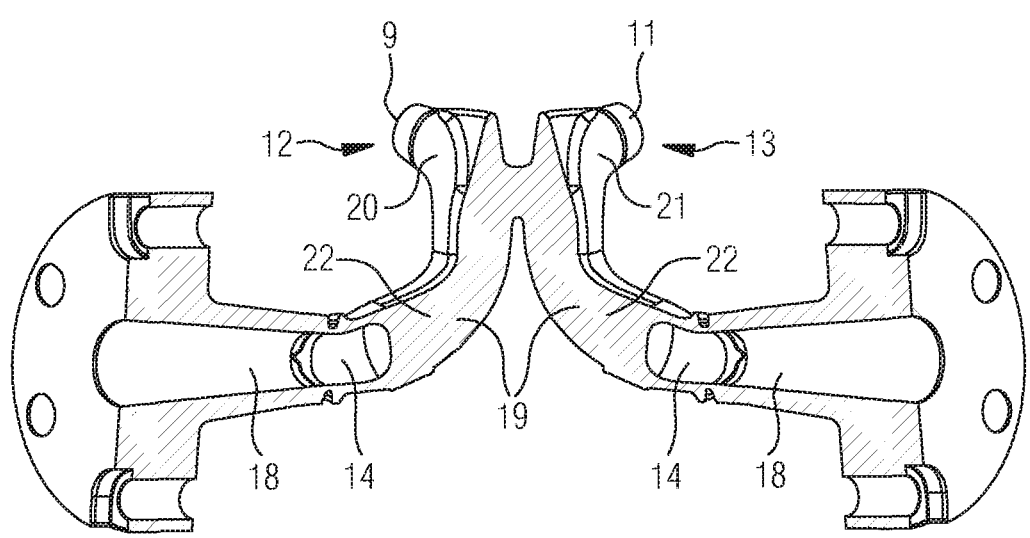
FIG. 3 shows the design according to the invention of a dynamic pressure pump corresponding to FIG. 2 in a sectioned opened-up view.

In the illustrative embodiment according to FIG. 2, the first working medium inlet 12 and the second working medium inlet 13 are each of arc-shaped configuration and are not connected directly to one another in a manner which allows transmission of working medium, or they have no connecting channel. The arcs of the first working medium inlet 12 and of the second working medium inlet 13 are denoted by 20 and 21. They serve to direct the initially oppositely directed flow channel path for the working medium in the same direction, starting in the first inlet opening 9 and the second inlet opening 11, with the result that the first working medium inlet 12 and the second working medium inlet 13 then extend adjacent to one another in the same direction before merging into the common working medium channels 14. In the illustrative embodiment shown, a common deflection 22 is provided in the section of the first working medium inlet 12 and of the second working medium inlet 13 over which these extend adjacent to one another in the same direction. To then prevent the working medium from being able to flow out of the first working medium inlet 12 into the second working medium inlet 13 or out of the first inlet opening 9 into the second inlet opening 11, the first working medium inlet 12 and the second working medium inlet 13 are separated from one another by a dividing wall 19, which here extends as far as the outlet of the two working medium inlets 12, 13 into the common working medium channel 14. In all cases, this common dividing wall 19 should extend as far in the flow direction of the working medium, starting from the two inlet openings 9, 11, that the pressure at the end of the dividing wall 19, as it were at the outlet end of the two working medium inlets 12, 13, has been reduced in such a way, starting from the dynamic pressure in one of the two inlet openings 9, 11, that an overflow into the respective other working medium inlet 12, 13 is avoided. An additional reduction in the pressure at this outlet point or at the outlet end of the dividing wall 19 can be achieved by forming a diffuser 18 in the common working medium channel 14, as is explained in greater detail below with reference to FIG. 3.

FIG. 3 furthermore once again shows the dividing wall 19, which extends along the two arcs 20, 21 and the deflection 22, which follows in the flow direction of the working medium, as far as the start of the common working medium channel 14. In the illustrative embodiment shown, both the two arcs 20, 21 and the deflection 22 have an angle of about 90°.

The common working medium channel 14 extends perpendicularly to the inflow direction of the working medium into the first inlet opening 9 and the second inlet opening 11 or, when used in a hydrodynamic machine, advantageously extends in the direction of the axis of rotation 10, cf. FIG. 1.

In the case of the diffuser 18 provided in the common flow channel 14, the flow cross section for the working medium widens with increasing length, with the result that the pressure at the rear end of the dividing wall 19, i.e. at the start of the common working medium channel 14, is reduced.

LIST OF REFERENCE SIGNS 1 primary wheel
2 secondary wheel
3 housing
4 work chamber
5 blades
6 secondary chamber
7 working medium outlet
8 dynamic pressure pump
9 first inlet opening
10 axis of rotation
11 second inlet opening
12 working medium inlet
13 working medium outlet
14 working medium channel
15 outflow opening
18 diffuser
19 dividing wall
20 arc
21 arc
22 deflection

The invention claimed is:

1. A hydrodynamic machine, comprising:
a bladed primary wheel driven around an axis of rotation;
a bladed secondary wheel which together with said bladed primary wheel form a work chamber to be filled with a working medium;
a secondary chamber fluidically connected to said work chamber;
a dynamic pressure pump for at least indirectly discharging the working medium from said work chamber or from the hydrodynamic machine, said dynamic pressure pump having a dividing wall, a first working medium inlet projecting into said work chamber or said secondary chamber, and a first inlet opening aligned in a circumferential direction with respect to the axis of rotation, said dynamic pressure pump further having a second working medium inlet projecting into said work chamber or into said secondary chamber connected to said work chamber in a manner which allows transmission of the working medium, and a second inlet opening aligned oppositely to said first inlet opening in the circumferential direction with respect to the axis of rotation;
said first working medium inlet and said second working medium inlet are joined in a manner which allows transmission of the working medium and form a common working medium channel after said first and second inlet openings; and
ahead of said common working medium channel as seen in a flow direction of the working medium, said first working medium inlet and said second working medium inlet extend adjacent to each other in a same direction and are separated by said dividing wall.

2. The hydrodynamic machine according to claim 1, wherein said first and second working medium inlets have a free, invariable flow cross section at least from said first and second inlet openings respectively thereof to said common working medium channel or to an end of said common working medium channel remote from said first and second inlet openings.

3. The hydrodynamic machine according to claim 1, wherein starting from said first and second inlet openings, respectively, said first working medium inlet and said second working medium inlet initially extend toward one another and then in each case in an arc in a common direction.

4. The hydrodynamic machine according to claim 3, further comprising a common deflector, said two arcs are followed in the flow direction of the working medium by said common deflector with an angle of 70° to 110°.

5. The hydrodynamic machine according to claim 4, wherein said dividing wall reaches into said deflector or as far as a rear end of said deflector as seen in the flow direction of the working medium and is then followed by said common working medium channel, which extends in a direction of the axis of rotation or parallel thereto.

6. The hydrodynamic machine according to claim 1, wherein said common working medium channel has a working medium transmission length which is a multiple of a working medium transmission length in each case from one of said first and second inlet openings to said common working medium channel.

7. The hydrodynamic machine according to claim 1, wherein said common working medium channel has a diffuser.

8. The hydrodynamic machine according to claim 1,
wherein the hydrodynamic machine is embodied as a hydrodynamic coupling;
wherein said bladed secondary wheel can be driven by said bladed primary wheel around the axis of rotation by means of working medium circulation in said work chamber; and
further comprising a storage chamber for the working medium that is not in said work chamber, said storage chamber being connected to said dynamic pressure pump in such a way that said dynamic pressure pump delivers the working medium discharged at least indirectly from said work chamber into said storage chamber, wherein said storage chamber is likewise disposed so as to revolve with respect to the axis of rotation or to be stationary.

9. The hydrodynamic machine according to claim 1, wherein said first and second working medium inlets of said dynamic pressure pump are held stationary or revolve around the axis of rotation through being driven by said dynamic pressure pump.

10. A dynamic pressure pump, comprising:
a first working medium inlet having a first inlet opening;
a second working medium inlet having a second inlet opening, said first inlet opening and said second inlet opening are aligned oppositely to one another and said first working medium inlet and said second working medium inlet are joined in a manner which allows transmission of a working medium and form a common working medium channel after said first and second inlet openings; and
a dividing wall, ahead of said common working medium channel as seen in a flow direction of the working medium, said first working medium inlet and said second working medium inlet extend adjacent to each other in a same direction and are separated by said dividing wall.

11. The dynamic pressure pump according to claim 10, wherein said first and second working medium inlets have a free, invariable flow cross section at least from said first and second inlet openings thereof to said common working medium channel or to an end of said common working medium channel remote from said first and second inlet openings.

12. The dynamic pressure pump according to claim 10, wherein starting from said first and second inlet openings, said first working medium inlet and said second working medium inlet respectfully initially extend toward one another and then each extend in an arc in a common direction.

13. The dynamic pressure pump according to claim 12, further comprising a common deflector, said two arcs are followed in the flow direction of the working medium by said common deflector with an angle of 70° to 110°.

14. The dynamic pressure pump according to claim 13, wherein said dividing wall reaches into said deflector or as far as a rear end of said deflector as seen in the flow direction of the working medium and is then followed by said common working medium channel, which, extends in a direction of the axis of rotation or parallel thereto.

15. The dynamic pressure pump according to claim 10, wherein said common working medium channel has a working medium transmission length which is a multiple of a working medium transmission length in each case from one of said first and second inlet openings to said common working medium channel.

16. The dynamic pressure pump according to claim 10, wherein said common working medium channel has a diffuser.

17. The dynamic pressure pump according to claim 12, further comprising a common deflector, said two arcs are followed in the flow direction of the working medium by said common deflector with an angle of 80° to 100°.

18. The dynamic pressure pump according to claim 12, further comprising a common deflector, said two arcs are followed in the flow direction of the working medium by said common deflector with an angle of 90°.

19. The dynamic pressure pump according to claim 15, wherein the multiple is at least three times the working medium transmission length.

20. The dynamic pressure pump according to claim 15, wherein the multiple is ten times the working medium transmission length.

* * * * *